(12) United States Patent
Sugiyama et al.

(10) Patent No.: US 8,858,345 B2
(45) Date of Patent: Oct. 14, 2014

(54) VEHICLE DAMPER DEVICE

(75) Inventors: Masataka Sugiyama, Toyota (JP);
Yoshinori Morita, Toyota (JP); Tadashi Takemura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/988,164

(22) PCT Filed: Nov. 19, 2010

(86) PCT No.: PCT/JP2010/070718
§ 371 (c)(1),
(2), (4) Date: May 17, 2013

(87) PCT Pub. No.: WO2012/066679
PCT Pub. Date: May 24, 2012

(65) Prior Publication Data
US 2013/0244799 A1     Sep. 19, 2013

(51) Int. Cl.
*F16F 15/121* (2006.01)
*F16D 3/12* (2006.01)
*F16D 7/00* (2006.01)
*F16F 15/139* (2006.01)
*F16D 7/02* (2006.01)

(52) U.S. Cl.
CPC .. *F16D 3/12* (2013.01); *F16D 7/00* (2013.01); *F16F 15/1392* (2013.01); *F16D 7/025* (2013.01)
USPC ............................. 464/68.2; 464/46; 464/68.8

(58) Field of Classification Search
USPC ................. 464/6, 46, 68.2, 68.4, 68.41, 68.8, 464/89–91; 192/201, 213.2–213.22; 74/574.2, 574.3
See application file for complete search history.

(56) References Cited

U.S. PATENT DOCUMENTS

| 1,196,015 | A | * | 8/1916 | Nelson ............................... 464/6 |
| 3,314,304 | A | * | 4/1967 | McGavern, Jr. et al. ..... 74/574.3 |
| 4,220,233 | A | | 9/1980 | Ban et al. |
| 4,611,701 | A | | 9/1986 | Friedmann |
| 4,727,970 | A | | 3/1988 | Reik et al. |
| 5,062,517 | A | * | 11/1991 | Muchmore et al. |
| 5,073,143 | A | | 12/1991 | Friedman et al. |
| 5,180,335 | A | | 1/1993 | Maucher et al. |
| 6,047,804 | A | | 4/2000 | Feldhaus et al. |
| 7,300,372 | B2 | * | 11/2007 | Riu ............................... 464/90 X |
| 2002/0049090 | A1 | | 4/2002 | Peinemann et al. |
| 2011/0031083 | A1 | | 2/2011 | Matsuoka et al. |

FOREIGN PATENT DOCUMENTS

| DE | 3425161 A1 | 1/1986 |
| DE | 3629225 A1 | 3/1987 |
| DE | 4317332 A1 | 12/1993 |
| DE | 102006031774 A1 | 1/2008 |
| EP | 1582766 A2 | 10/2005 |
| JP | A-11-82628 | 3/1999 |
| JP | A-2009-293671 | 12/2009 |

* cited by examiner

*Primary Examiner* — Gregory Binda
(74) *Attorney, Agent, or Firm* — Oliff PLC (57) ABSTRACT

A vehicle damper device disposed between a power transmission member coupled to an output shaft of an engine and a power transmission shaft disposed concentrically and rotatably relative to the power transmission member, the vehicle damper device includes: an input-side rotating member to which power of the engine is input via the power transmission member; an output-side rotating member relatively non-rotatably coupled to the power transmission shaft to be concentric and rotatable relative to the input-side rotating member; a mass body disposed rotatably relative to the input-side rotating member; a first elastic member interposed between the input-side rotating member and the mass body; and a second elastic member interposed between the input-side rotating member and the output-side rotating member.

4 Claims, 4 Drawing Sheets

VEHICLE DAMPER DEVICE

TECHNICAL FIELD

The present invention relates to a vehicle damper device and particularly to a structure of a damper capable of achieving high damping effect to pulsation of transmitted power.

BACKGROUND ART

A vehicle damper device is well known that is disposed on a power transmission path between a power transmission member coupled to a crankshaft of an engine and an output shaft to suppress transmission of torsional vibration during power transmission. One example is a damper device included in a lockup device disposed on a hydraulic power transmission device of Patent Document 1, for example. The damper device included in the lockup device of Patent Document 1 mainly includes a piston, a first coil spring, an inertia member, a second coil spring, and an output plate. The first coil spring is interposed between the piston and the output plate in a power transmittable manner and the second coil spring is interposed between the inertia member and the output plate in a power transmittable manner.

In the damper device of the lockup device of Patent Document 1, the inertia member and the second coil spring act as a dynamic damper. Therefore, if torsional resonance occurs in a drive system, vibration energy thereof is absorbed by the dynamic damper. The natural frequency of the dynamic damper is adjusted to a value substantially identical to the natural frequency of the drive system by adjusting the inertial mass of the inertia member and the stiffness of a second elastic member.

PRIOR ART DOCUMENT

Patent Document

Patent Document 1: Japanese Laid-Open Patent Publication No. 2009-293671

SUMMARY OF THE INVENTION

Problem to be Solved by the Invention

In an engine acting as a vehicle drive source, an explosion first-order (rotation second-order in the case of a four-cylinder engine) component is conventionally dominant as an explosion compelling force; however, since recent measures for lower fuel consumption make engine combustion lean and the combustion is correspondingly made unstable, compelling forces of conventionally negligible lower-order components such as rotation first-order and rotation 0.5th-order components tend to increase. Therefore, although a rotational second-order torsional resonance band of a drive system is set equal to or less than an engine normal rotation speed, the rotation lower-order torsional resonance of the drive system occurs at the engine normal rotation speed and problematically affects NV characteristics and drivability.

In this regard, a method exists that damps the torsional resonance with a dynamic damper as in the damper device of Patent Document 1. However, since the damper device of Patent Document 1 has the dynamic damper (the inertia member and the second elastic member) disposed on an output-side member (turbine) of the lockup device, the dynamic damper absorbs small vibration energy and it is difficult to effectively damp the torsional resonance. This is because a structure with larger inertial mass generally has larger vibration energy and the vibration energy of the structure has a significant effect at the time of occurrence of the torsional resonance while the output-side member (turbine) has inertial mass smaller than inertial mass of input-side members (such as an engine and a flywheel) and has smaller vibration energy. Therefore, the damper device of Patent Document 1 cannot achieve a high damping effect in the case of occurrence of the rotation second-order torsional resonance of the drive system as well as the lower-order torsional resonance of the drive system, such as the rotation first-order and rotation 0.5th-order torsional resonance.

Another means for solving the problem includes a method in which spring stiffness of a conventional damper device is increased to increase the natural frequency of the drive system or hysteresis torque (internal friction resistance) of a damper device is increased so as to suppress the torsional resonance. However, in either method, vibration transmission sensitivity is increased in a high frequency range equal to or greater than the natural frequency and problematically generates engine booming noise and gear rattle noise.

The present invention was conceived in view of the situations and it is therefore an object of the present invention to provide a vehicle damper device capable of achieving a high damping effect in a torsional resonance band without increasing transmission sensitivity in a high frequency range.

Means for Solving the Problems

To achieve the object, the first aspect of the invention provides (a) a vehicle damper device disposed between a power transmission member coupled to an output shaft of an engine and a power transmission shaft disposed concentrically and rotatably relative to the power transmission member, (b) the vehicle damper device comprising: (c) an input-side rotating member to which power of the engine is input via the power transmission member; (d) an output-side rotating member relatively non-rotatably coupled to the power transmission shaft to be concentric and rotatable relative to the input-side rotating member; (e) a mass body disposed rotatably relative to the input-side rotating member; (f) a first elastic member interposed between the input rotating member and the mass body, the first elastic member operatively coupling the input-side rotating member and the mass body while elastically deforming depending on a relative rotation amount between the input-side rotating member and the mass body; and (g) a second elastic member interposed between the input-side rotating member and the output-side rotating member, the second elastic member operatively coupling the input-side rotating member and the output-side rotating member while elastically deforming depending on a relative rotation amount between the input-side rotating member and the output-side rotating member.

The Effects of the Invention

Consequently, the dynamic damper is made up of the mass body and the first elastic member operatively coupling the mass body to the input-side rotating member. The input-side rotating member is coupled to the engine via the power transmission member, and therefor has larger inertial mass as compared to the output-side rotating member. Since the dynamic damper is coupled to the side of the input-side rotating member having the inertial mass larger than the output-side rotating member, the damping effect of the dynamic damper is increased. This is because a structure having larger inertial mass generally has larger vibration energy at the time of resonance and, when the dynamic damper is coupled to the side of the input-side rotating member corresponding to the structure having large inertial mass, the vibration energy at the time of occurrence of torsional resonance is effectively absorbed by the dynamic damper. Since the damper characteristics are basically not different from basic characteristics of a conventional damper device except that the dynamic damper is provided, the vibration transmission sensitivity is prevented from increasing on the high frequency side.

Preferably, the first elastic member and the second elastic member are made up of coil springs, and the first elastic member is disposed on the outer circumferential side relative to the second elastic member. Consequently, since a load applied to the first elastic member becomes smaller when the first elastic member is disposed on the outer circumferential side even if torque is the same, the spring stiffness of the first elastic member can be lowered. Therefore, the natural frequency of the dynamic damper proportional to the spring stiffness of the first elastic member can be set to a lower frequency. Since the first elastic member and the second elastic member are made up of coil springs, the dynamic damper has highly reliable and stable torsional characteristics as compared to rubber etc., and has high robustness of frequency against change in temperature.

Preferably, the damper device is disposed at a position axially separated by a predetermined value from the power transmission member, and the mass body is disposed on the outer circumferential side relative to the first elastic member. Consequently, the mass body can be disposed in a space formed on the outer circumferential side of the first elastic member by disposing the damper device at a position axially separated from the power transmission member. Since the mass body is disposed in the space, an adjustment width of the mass body is expanded and the inertial mass of the mass body can easily be increased.

Preferably, a torque limiter mechanism for preventing transmission of torque exceeding a preset torque value is interposed between the power transmission member and the input-side rotating member. Consequently, if a torque exceeding the preset torque value is input from the side of the engine, a slip occurs in the torque limiter mechanism and the torque exceeding the torque value is not transmitted to the downstream power transmission path from the damper device. Therefore, the torque limiter mechanism acts as a safety device to prevent damage and durability deterioration of the drive system including the damper device due to excessive torque transmission.

Preferably, the friction mechanism consisting of the friction plates and the disc spring is disposed between the input-side rotating member and the mass body. Consequently, the vibration damping effect from the friction mechanism can also be achieved in addition to the basic performance of the dynamic damper by adjusting the friction coefficients and the arrangement positions of the friction plates and the stiffness of the disc spring, etc.

Preferably, a pin for holding the input-side rotating member comes into contact with the mass body when a relative rotation amount between the input-side rotating member and the mass body reaches a predetermined value set in advance and comes into contact with the output-side rotating member when a relative rotation amount between the input-side rotating member and the output-side rotating member reaches a predetermined value set in advance to act as a stopper pin limiting elastic deformation amounts of the first elastic member and the second elastic member. This leads to the utilization of the stopper pins as members holding the input-side rotating member as well as protecting the first elastic member and the second elastic member. Therefore, the common stopper pins having two functions can reduce the number of pins, thereby suppressing manufacturing costs.

MODE FOR CARRYING OUT THE INVENTION

An embodiment of the present invention will now be described in detail with reference to the drawings. The figures are simplified or deformed as needed in the following embodiment and portions are not necessarily precisely depicted in terms of dimension ratio, shape, etc.

Embodiment

Figure 1:
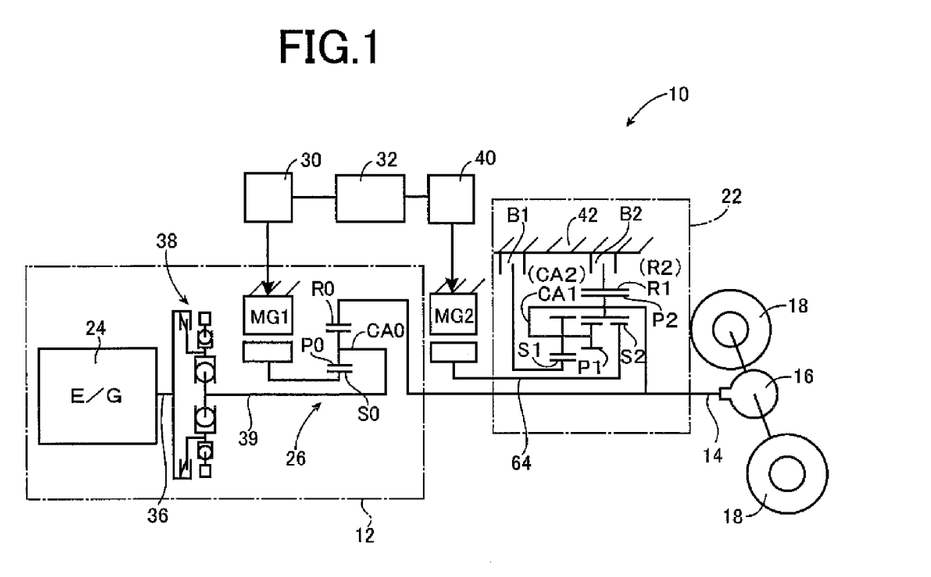
FIG. 1 is a schematic of a configuration for explaining a hybrid vehicle drive device to which the present invention is applied.

FIG. 1 is a schematic of a configuration for explaining a hybrid vehicle drive device 10 to which the present invention is applied. In FIG. 1, the vehicle drive device 10 transmits a torque of a first drive source 12, i.e., a main drive source, to a wheel-side output shaft 14 acting as an output member in a vehicle such that the torque is transmitted from the wheel-side output shaft 14 via a differential gear device 16 to a pair of left and right drive wheels 18. The vehicle drive device 10 is disposed with a second electric motor MG2 capable of selectively providing power running control for outputting drive power for running and regenerative control for recovering energy as a second drive source and the second electric motor MG2 is coupled via an automatic transmission 22 to the wheel-side output shaft. Therefore, the output torque transmitted from the second electric motor MG2 to the wheel-side output shaft is increased and decreased depending on a gear ratio γs (=rotation speed Nmg2 of the second electric motor MG2/rotation speed Nout of the wheel-side output shaft) set by the automatic transmission 22.

The automatic transmission 22 interposed in a power transmission path between the second electric motor MG2 and the drive wheels 18 is configured such that a plurality of stages having the gear ratio γs greater than "1" can be established; at the time of power running when a torque is output from the second electric motor MG2, the torque can be increased and transmitted to the wheel-side output shaft; and, therefore, the second electric motor MG2 is configured with a lower capacity or in a smaller size. As a result, for example, if the rotation speed Nout of the wheel-side output shaft is increased in association with a higher vehicle speed, the gear ratio γs is made smaller to reduce the rotation speed (hereinafter referred to as a second electric motor rotation speed) Nmg2 of the second electric motor MG2 so as to maintain the operation efficiency of the second electric motor MG2 in a favorable state, or if the rotation speed Nout of the wheel-side output shaft is reduced, the gear ratio γs is made larger to increase the second electric motor rotation speed Nmg2.

The first drive source 12 is mainly made up of an engine 24 acting as a main power source, a first electric motor MG1, and a planetary gear device 26 acting as a power distribution mechanism for combining or distributing torque between the engine 24 and the first electric motor MG1. The engine 24 is a known internal combustion engine combusting fuel to output power, such as a gasoline engine and a diesel engine, and is configured to have an operational state, such as a throttle valve opening degree and an intake air amount, a fuel supply amount, and an ignition timing, electrically controlled by an electronic control device for engine control (E-ECU) not depicted mainly made up of a microcomputer. The electronic control device is supplied with detection signals from an accelerator operation amount sensor AS detecting an operation amount of an accelerator pedal, a brake sensor BS for detecting the presence of operation of a brake pedal, etc.

The first electric motor MG1 is, for example, a synchronous electric motor, configured to selectively fulfill a function as an electric motor generating a drive torque and a function as an electric generator, and is connected via an inverter 30 to an electric storage device 32 such as a battery and a capacitor. The inverter 30 is controlled by an electronic control device for motor generator control (MG-ECU) not depicted mainly made up of a microcomputer to adjust or set the output torque or the regenerative torque of the first electric motor MG1.

The planetary gear device 26 is a single pinion type planetary gear mechanism including a sun gear S0, a ring gear R0 disposed concentrically to the sun gear S0, and a carrier CA0 supporting a pinion gear P0 engaging with the sun gear S0 and the ring gear R0 in a rotatable and revolvable manner as three rotating elements to generate a known differential action. The planetary gear device 26 is disposed concentrically to the engine 24 and the automatic transmission 22. Since the planetary gear device 26 and the automatic transmission 22 are symmetrically configured relative to a center line, the lower halves thereof are not depicted in FIG. 1.

In this embodiment, a crankshaft 36 (corresponding to an output shaft of an engine of the present invention) of the engine 24 is coupled via a damper device 38 (corresponding to a vehicle damper device of the present invention) and a power transmission shaft 39 to the carrier CA0 of the planetary gear device 26. On the other hand, the sun gear S0 is coupled to the first electric motor MG1, and the ring gear R0 is coupled to the wheel-side output shaft. The carrier CA0, the sun gear S0, and the ring gear R0 act as an input element, a reaction force element, and an output element, respectively.

If a reaction torque from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When the rotation speed of the ring gear R0, i.e., the rotation speed (output shaft rotation speed) Nout of the wheel-side output shaft 14 is constant, a rotation speed (engine rotation speed) Ne of the engine 24 can continuously (non-stepwise) be changed by changing a rotation speed Nmg1 of the first electric motor MG1 higher and lower.

The automatic transmission 22 of the embodiment is made up of a set of Ravigneaux type planetary gear mechanisms. In other words, the automatic transmission 22 is disposed with a first sun gear S1 and a second sun gear S2; a larger diameter portion of a stepped pinion P1 engages with the first sun gear S1; a smaller diameter portion of the stepped pinion P1 engages with a pinion P2; and the pinion P2 engages with a ring gear R1 (R2) disposed concentrically to the sun gears S1 and S2. The pinions P1 and P2 are held by a common carrier CA1 (CA2) in a rotatable and revolvable manner. The second sun gear S2 engages with the pinion P2.

The second electric motor MG2 is controlled via an inverter 40 by the electronic control device for motor generator control (MG-ECU) to act as an electric motor or an electric generator and the assist output torque or the regenerative torque is adjusted or set. The second sun gear S2 is coupled to the second electric motor MG2 and the carrier CA1 is coupled to the wheel-side output shaft. The first sun gear S1 and the ring gear R1 make up a mechanism corresponding to a double pinion type planetary gear device along with the pinions P1 and P2 and the second sun gear S2 and the ring gear R1 make up a mechanism corresponding to a single pinion type planetary gear device along with the pinion P2.

The automatic transmission 22 is disposed with a first brake B1 disposed for selectively fixing the first sun gear S1 between the first sun gear S1 and a housing 42 that is a non-rotating member, and a second brake B2 disposed for selectively fixing the ring gear R1 between the ring gear R1 and the housing 42. The brakes B1, B2 are so-called friction engagement devices using a frictional force to generate a braking force and are implemented by employing multi-plate type engagement devices or band-type engagement devices. The brakes B1, B2 are configured such that torque capacities thereof are respectively continuously changed depending on engagement pressures generated by a hydraulic actuator for the brake B1 and a hydraulic actuator for the brake B2 such as hydraulic cylinders.

The automatic transmission 22 configured as described above is configured such that the second sun gear S2 acts as an input element, that the carrier CA1 acts as an output element, that a high-speed stage H is established with a gear ratio γsh greater than "1" when the first brake B1 is engaged, and that a low-speed stage L is established with a gear ratio γsl greater than the gear ratio γsh of the high-speed stage H when the second brake B2 is engaged instead of the first brake B1. In other words, the automatic transmission 22 is a two-speed transmission in which a shift between the gear stages H and L is performed based on a running state such as a vehicle speed V and a required drive power (or an accelerator operation amount). More specifically, gear stage ranges are determined in advance as a map (shift diagram) and control is provided such that one of the gear stages is set depending on a detected operational state.

Since the electric motors (the first electric motor MG1 and the second electric motor MG2) are disposed on the power transmission path between the damper device 38 and the drive wheels 18, the vehicle drive device 10 of the embodiment has relatively large inertial mass on the downstream side from the damper device 38 (on the side of the drive wheels 18). Therefore, if torsional resonance in the vehicle drive device 10 is caused by a vibration source that is torque variation of the engine 24, the amplitude of torsional vibration thereof easily increases. This is because larger inertial mass generally makes vibration energy larger at the time of occurrence of resonance.

Since engine combustion is designed to be lean, the engine 24 of the embodiment tends to cause unstable combustion (such as poor combustion). Therefore, a compelling force tends to increase in a lower order such as a rotation first order and a rotation 0.5th order other than an explosion first order (a rotation second order in the case of a four-cylinder engine), which is dominant as a conventional explosion compelling force of the engine 24. Therefore, torsional resonance is conventionally generated by rotation first-order and rotation 0.5th-order compelling forces in an engine normal rotation speed range in addition to torsional resonance (the rotation second order) generated in a range equal to or less than the engine normal rotation speed, significantly affecting NV characteristics and drivability. A rotation first-order compelling force is a compelling force due to occurrence of one explosion per engine rotation; a rotation second-order compelling force (corresponding to the explosion first order in the case of a four-cylinder engine) is a compelling force due to occurrence of two explosions per engine rotation; and an explosion 0.5th-order compelling force is a compelling force due to occurrence of 0.5 explosions per engine rotation (i.e., one explosion for every two engine rotations).

To address these problems in a conventional damper device, the spring stiffness of the damper device is increased to increase a natural frequency of a drive system or the hysteresis torque of the damper device is increased so as to suppress the torsional resonance; however, in either case, vibration transmission sensitivity (gain) is increased in a high frequency range equal to or greater than the natural frequency of the drive system and engine booming noise and gear rattle noise problematically occur in the high frequency range. On the other hand, the damper device 38 of the embodiment can effectively reduce the amplitude at the time of occurrence of torsional resonance without deteriorating the vibration transmission sensitivity in the high frequency range. Configuration and effect of the damper device 38 will hereinafter be described in detail.

Figure 2:
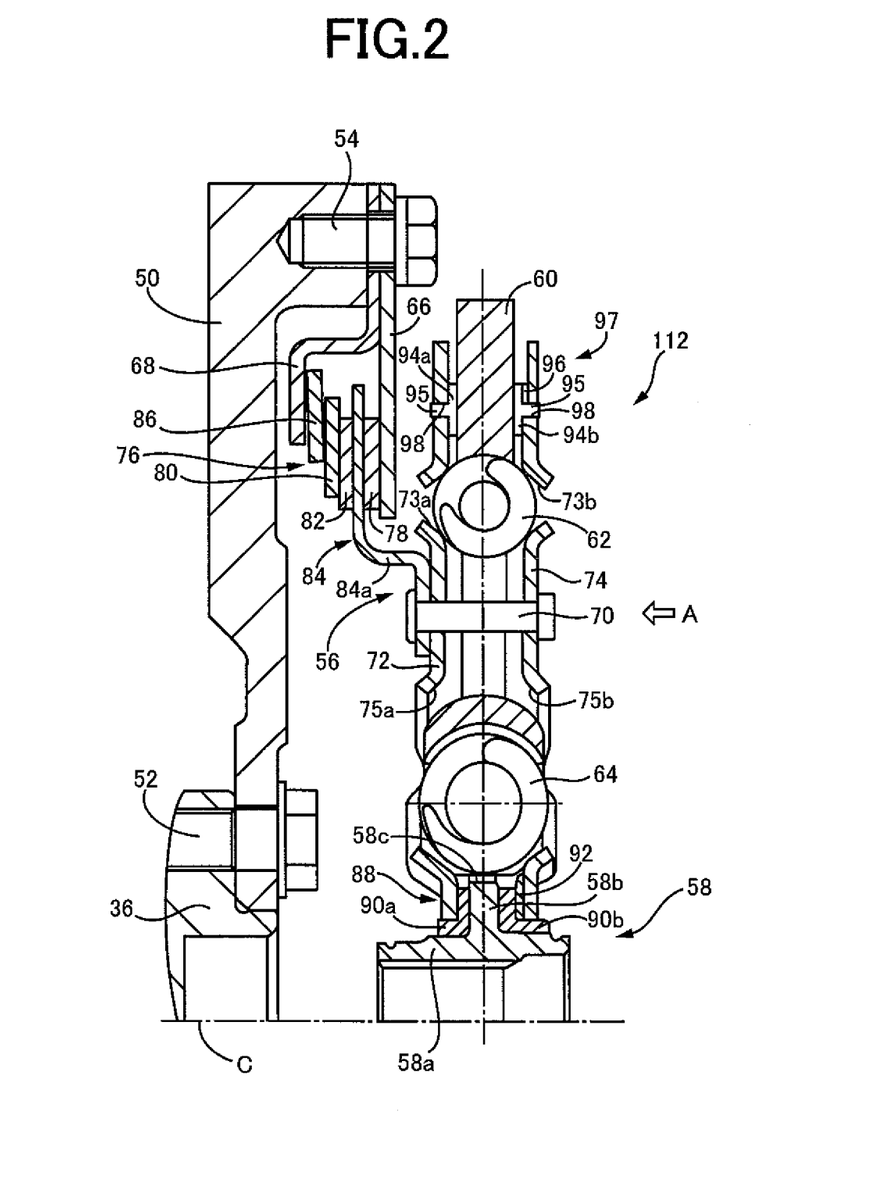
FIG. 2 is a cross-sectional view of a detailed configuration of the damper device depicted in FIG. 1.

FIG. 2 is a cross-sectional view of a detailed configuration of the damper device 38 depicted in FIG. 1. The damper device 38 of the embodiment is disposed around an axial center C between a disc-like flywheel 50 (corresponding to a power transmission member of the present invention) and the power transmission shaft 39 depicted in FIG. 1 disposed rotatably relative to the flywheel 50. Although the power transmission shaft 39 is not depicted in FIG. 2, the power transmission shaft 39 is actually spline-fitted to an output-side rotating member 58 described later. Since the damper device 38 is substantially symmetric relative to the axial center C, the lower half thereof is not depicted. The flywheel 50 is a disc-like member fastened on the inner circumferential side by a bolt 52 to the crankshaft 36 of the engine 24 and is configured with certain inertial mass.

The damper device 38 includes an input-side rotating member 56 to which the power of the engine 24 is transmitted via the crankshaft 36, the flywheel 50, and a torque limiter mechanism 76 described later; an output-side rotating member 58 relatively non-rotatably coupled to the power transmission shaft 39 and disposed concentrically (on the axial center C) and rotatably relative to the input-side rotating member 56; an annular flange 60 (corresponding to a mass body of the present invention) disposed rotatably relative to the input-side rotating member 56 and having preset inertial mass; a first coil spring 62 (corresponding to a first elastic member of the present invention) made of spring steel interposed between the input-side rotating member 56 and the flange 60 and operatively coupling the input-side rotating member 56 and the flange 60 while elastically deforming depending on a relative rotation amount therebetween; and a second coil spring 64 (corresponding to a second elastic member of the present invention) interposed between the input-side rotating member 56 and the output-side rotating member 58 and operatively coupling the input-side rotating member 56 and the output-side rotating member 58 while elastically deforming depending on a relative rotation amount therebetween. In this embodiment, the first coil spring 62 is on the outer circumferential side of the second coil spring 64 and the center of the first coil spring 62 and the center of the second coil spring 64 are arranged at positions coincident with each other in the direction of the axial center C.

The input-side rotating member 56 is made up of a pair of a disc-like first plate 72 and a second plate 74 fixed relatively non-rotatably to each other by a stopper pin 70 (pin) consisting of a rivet with the first coil spring 62 and the second coil spring 64 sandwiched in the axial direction (axial center direction).

A first open hole 73a for receiving the first coil spring 62 and a second open hole 75a for receiving the second coil spring 64 are formed in the first plate 72. A first open hole 73b for receiving the first coil spring 62 and a second open hole 75b for receiving the second coil spring 64 are similarly formed in the second plate 74.

The torque limiter mechanism 76 is disposed for preventing transmission of torque exceeding a preset torque value and is interposed between the flywheel 50 and the input-side rotating member 56. The torque limiter mechanism 76 includes a circular plate-like first input plate 66 and a disc-like second input plate 68 with a partially folded cross-section each having an outer circumferential portion fastened by a bolt 54 to the flywheel 50; a circular plate-like friction plate 78 bonded to the inner circumferential side of the first input plate 66; a circular plate-like friction plate 82 bonded to a circular plate-like intermediate member 80; a disc-like limiter lining plate 84 having an outer circumferential portion sandwiched by the friction plate 78 and the friction plate 82 and an inner circumferential portion fastened by the stopper pin 70 to be non-rotatable relative to the first plate 72 and the second plate 74; and a cone-shaped disc spring 86 axially inserted between an inner circumferential portion of the second input plate 68 and the intermediate member 80 and pressing the intermediate member 80 toward the friction plate 82 to generate a predetermined friction force between the friction plates 78 and 82 and the limiter lining plate 84.

Since the limiter lining plate 84 has a folded portion 84a formed in a radially-intermediate portion in parallel with the axial center C, the inner circumferential and outer circumferential portions of the limiter lining plate 84 are set at axially-separated positions. The inner circumferential portion of the limiter lining plate 84 is fastened by the stopper pin 70 to the first plate 72 and the second plate 74 and therefor integrally rotated with the plates 72 and 74. The disc spring 86 is axially inserted between the second input plate 68 and the intermediate member 80 and presses the intermediate member 80 with an elastic recovery force toward the friction plate 82 and, therefore, a friction force is generated between the friction plates 78 and 82 and the limiter lining plate 84 via the intermediate member 80. The stiffness of the disc spring 86 is obtained in advance from experimentation or calculation and set such that if a torque exceeding an allowable torque value preset in the damper device 38 is applied, a slip (relative rotation) occurs between the friction plates 78 and 82 and the limiter lining plate 84. Therefore, a torque exceeding the allowable torque value is not transmitted to the damper device 38, which prevents the damper device 38, the planetary gear device 26, etc., (drive system) from being damaged or deteriorated in durability due to excessive torque transmission.

The output-side rotating member 58 is made up of a cylindrical hub portion 58a having inner circumferential teeth formed for spline-fitting of the power transmission shaft 39 to an inner circumferential portion, and a disc-like flange portion 58b extended to the outer circumferential side from an outer circumferential surface of the hub portion 58a.

On the inner circumferential side of the first coil spring 62, a hysteresis mechanism 88 is disposed for generating a hysteresis torque of the damper device 38. The hysteresis mechanism 88 includes a pair of friction plates 90a and 90b having an L-shaped cross-section inserted into a gap between the inner circumferential end of the first plate 72 and the flange portion 58b and a gap between the inner circumferential end of the second plate 74 and the flange portion 58b, and a disc spring 92 inserted into a gap between the friction plate 90b and the inner circumferential end of the second plate 74. An elastic recovery force of the disc spring 92 generates a hysteresis torque acting between both the first plate 72 and the second plate 74 and the flange portion 58b. The hysteresis torque generated by the hysteresis mechanism 88 is properly adjusted by adjusting the stiffness of the disc spring 92.

The flange 60 is disposed on the outer circumferential side of the first coil spring 62. The flange 60 is an annular member having preset inertial mass and is disposed to be received in a gap between the first plate 72 and the second plate 74 in an axial direction. The flywheel 50 and the damper device 38 are set at positions axially separated by a predetermined value such that the flange 60 can be disposed on the outer circumferential side of the first coil spring 62. Specifically, the flywheel 50 and the damper device 38 are set at positions axially separated to the extent that a space is formed on the outer circumferential side of the first coil spring 62. Therefore, the axial length of the folded portion 84a formed in the limiter lining plate 84 is set such that the flywheel 50 and the damper device 38 are arranged at positions axially separated to the extent that a space is formed on the outer circumferential side of the first coil spring 62.

A pair of friction plates 94a and 94b is axially interposed in a gap between the first plate 72 and the flange 60 and in a gap between the second plate 74 and the flange 60. The friction plates 94a and 94b have respective protruding portions 95 formed and extended in the axial direction and the protruding portions 95 are fitted into fitting holes 98 formed in the first plate 72 and the second plate 74 to make the friction plates 94a and 94b non-rotatable relative to the first plate 72 and the second plate 74. A disc spring 96 is inserted between the friction plate 94b and the second plate 74 to generate a friction force between the flange 60 and both the first plate 72 and the second plate 74 depending on an elastic recovery force of the disc spring 96. A friction mechanism 97 having a vibration damping function is made up of the friction plates 94a and 94b and the disc spring 96.

Figure 3:
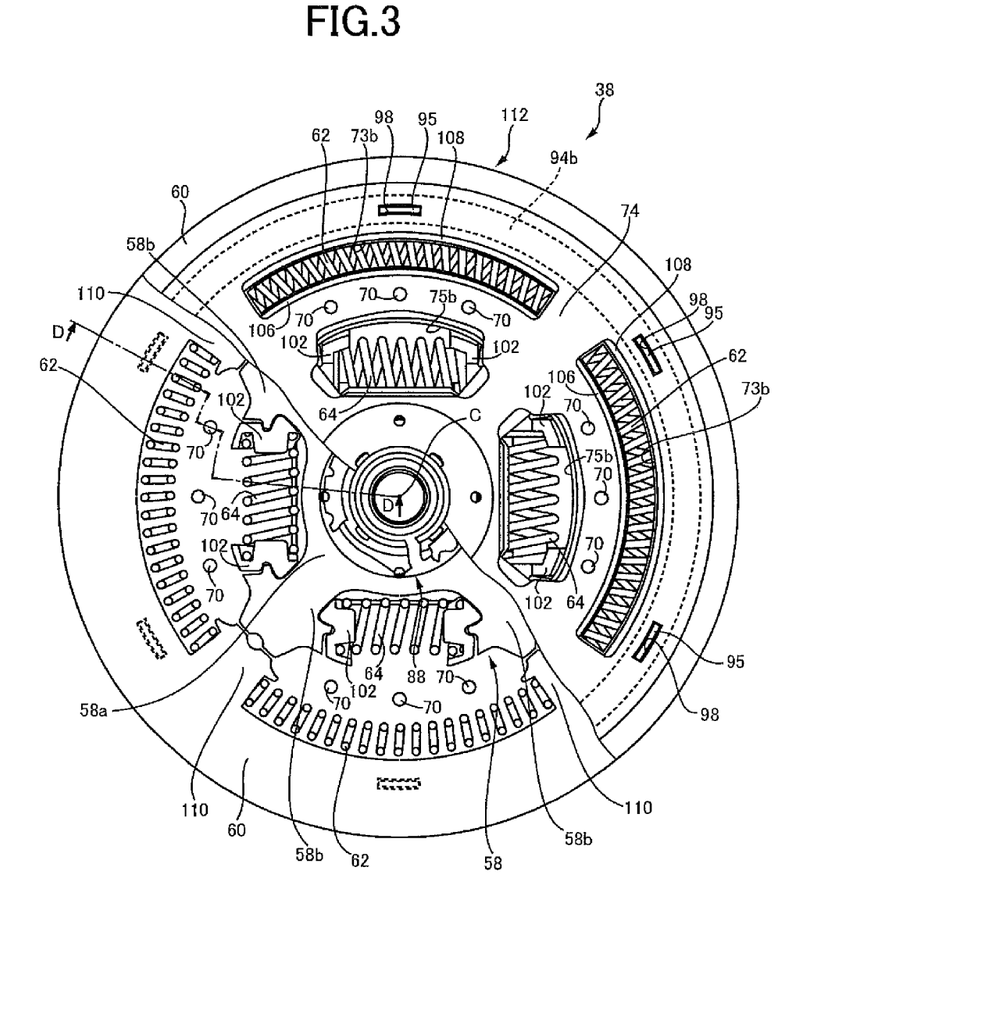
FIG. 3 is an arrow view of the damper device of FIG. 2 viewed from the side of an arrow A.

FIG. 3 is an arrow view of the damper device 38 of FIG. 2 viewed from the side of an arrow A (the side of the second plate 74) and partially depicts a cross-section acquired by cutting along a cutting line B depicted in FIG. 2. The cross-sectional view depicted in FIG. 2 corresponds to a cross-sectional view acquired by cutting along a cutting line D of FIG. 3. As depicted in FIG. 3, the damper device 38 has the four second open holes 75b formed in the second plate 74 at equal angular intervals in a circumferential direction for receiving the second coil springs 64 and the second coil springs 64 are respectively received in the second open holes 75b. Each of the second coil springs 64 is held at both axial ends and prevented from dropping off by spring holding members 102 made of reinforced plastic, for example. The first plate 72 is configured in substantially the same manner as the second plate 74 such that the second coil springs 64 can be held.

The second plate 74 has the four first open holes 73b formed on the outer circumferential side of the second open holes 75b at equal angular intervals in a circumferential direction for receiving the first coil springs 62 and the first coil springs 62 are respectively received in the first open holes 73b. The first coil springs 62 have an axial length longer than the second coil springs 64 as depicted in FIG. 3 and are formed into an arch shape. The first coil springs 62 are held and prevented from dropping off by spring holding walls 106 formed into an arc shape on the inner circumferential side of the first open holes 73b and spring holding walls 108 formed into an arc shape on the outer circumferential side of the first open holes 73b. The first plate 72 also has the spring holding walls 106 and the spring holding walls 108 formed in substantially the same manner as the second plate 74 to hold the first coil springs 62 such that the springs cannot drop off. As depicted in FIGS. 2 and 3, the first plate 72 and the second plate 74 are relatively non-rotatably fixed by a plurality of the circumferentially arranged stopper pins 70. An axial gap between the first plate 72 and the second plate 74 is maintained constant. The stopper pins 70 not only fix the first plate 72 and the second plate 74, but also act as rivets for fastening the limiter lining plate 84 of the torque limiter mechanism 76 to the input-side rotating member 56 (the first plate 72 and the second plate 74).

As depicted in the cross-sectional view of FIG. 3, the output-side rotating member 58 has the four flange portions 58b formed and extended toward the outer diameter at equal angular intervals in a circumferential direction. The second coil springs 64 are respectively inserted into gaps formed between the flange portions 58b. As depicted in the cross-sectional view of FIG. 3, the flange 60 has four partition walls 110 formed and extended toward the inner circumference at equal angular intervals in a circumferential direction. The first springs 62 are respectively inserted into gaps formed between the partition walls 110.

The stopper pins 70 also act as a damper protection device limiting a relative rotation amount between the input-side rotating member 56 (the first plate 72 and the second plate 74) and the flange portions 58b of the output-side rotating member 58 within a predetermined amount set in advance. As depicted in the cross-sectional view of FIG. 3, if a relative rotation amount between the flange portions 58b and both the first plate 72 and the second plate 74 reaches the predetermined amount set in advance because of; for example, occurrence of significant torque variation in the engine 24, the flange portions 58b and the stopper pins 70 are brought into contact with each other and prevented from further relatively rotating. In other words, an elastic deformation amount (an operating angle) of the second coil springs 64 is limited within a preset value to prevent damage and durability deterioration of the second coil springs and the spring holding members 102.

The stopper pins 70 also act as a damper protection device limiting a relative rotation amount between the input-side rotating member 56 (the first plate 72 and the second plate 74) and the flange 60 within a predetermined value set in advance. As depicted in the cross-sectional view of FIG. 3, if a relative rotation amount between both the first plate 72 and the second plate 74 and the flange 60 reaches the predetermined value set in advance because of, for example, occurrence of significant torque variation in the engine 24, the partition walls 110 of the flange 60 and the stopper pins 70 are brought into contact with each other and prevented from further relatively rotating. In other words, an elastic deformation amount (an operating angle) of the first coil springs 62 is limited within a preset value to prevent damage and durability deterioration of the first coil springs 62. Therefore, the stopper pins 70 not only limit the relative rotation amount between the input-side rotating member 56 (the first plate 72 and the second plate 74) and the flange portions 58b (the output-side rotating member 58), but also have a function of limiting the relative rotation amount between the input-side rotating member 56 (the first plate 72 and the second plate 74) and the flange 60.

Because of the configuration as described above, when the rotation of the engine 24 is transmitted via the crankshaft 36, the flywheel 50, and the torque limiter mechanism 76 to the input-side rotating member 56 (the first plate 72 and the second plate 74), the rotation is transmitted via the spring holding Members 102 and the second coil springs 64 to the output-side rotating member 58 (the flange portions 58b). In this case, the second coil springs 64 transmit the rotation to the flange portions 58b while being elastically deformed depending on relative rotation generated between the input-side rotating member 56 and the output-side rotating member 58 (the flange 58b). Therefore, the second coil springs 64 operatively couple the input-side rotating member 56 and the flange portions 58b (the output-side rotating member 58) while elastically deforming depending on the relative rotation therebetween. Since the output-side rotating member 58 is coupled to the power transmission shaft 39, the rotation thereof is input to the carrier CA0 of the planetary gear device 26.

The rotation of the input-side rotating member 56 is transmitted via the first coil springs 62 to the flange 60. In this case, the first coil springs 62 transmit the rotation to the flange 60 while being elastically deformed depending on relative rotation generated between the input-side rotating member 56 and the flange 60. Therefore, the first coil springs 62 operatively couple the input-side rotating member 56 and the flange 60 while elastically deforming depending on the relative rotation therebetween.

As described above, the flange 60 is coupled via the first coil springs 62 to the input-side rotating member 56 (the first plate 72 and the second plate 74), thereby making up a dynamic damper 112 consisting of the flange 60 and the first coil springs 62. The friction plate 94a, the friction plate 94b, and the disc spring 96 inserted between the flange 60 and both the first plate 72 and the second plate 74 act as a damping mechanism (damping term) of the dynamic damper 112. Since the second coil springs 64 are used as elastic members making up the dynamic damper 112, the dynamic damper 112 has highly reliable and stable torsional characteristics as compared to rubber etc., and has high robustness of frequency against change in temperature. Since the first coil springs 62 are operatively coupled to the first plate 72 and the second plate 74 holding the second coil springs 64, i.e., the first plate 72 and the second plate 74 are used in common, the dynamic damper 112 suppresses an increase in the number of components due to the provision of the dynamic damper 112.

In the damper device 38 of the embodiment, the dynamic damper 112 mainly made up of the flange 60 and the first coil springs 62 is coupled to the input-side rotating member 56. Since the input-side rotating member 56 is coupled to the engine 24 and the flywheel 50, the dynamic damper 112 is coupled to a structure having large inertial mass including the engine 24 and the flywheel 50. This structure having large inertial mass corresponds to a structure including the engine 24 and the flywheel 50 having larger inertial mass as compared to the power transmission shaft 39 coupled to the output-side rotating member 58.

When the dynamic damper 112 is connected to the structure having large inertial mass (the engine 24 and the flywheel 50), the vibration damping effect (vibration absorbing effect) of the dynamic damper 112 is increased at the time of occurrence of torsional resonance. A structure having larger inertial mass generally has larger vibration energy at the time of occurrence of torsional resonance. If the dynamic damper 112 is connected to the structure having large inertial mass, the vibration energy is effectively absorbed by the dynamic damper 112. Therefore, the coupling of the dynamic damper 112 to the input-side rotating member 56 causes the dynamic damper 112 to absorb the vibration energy of the engine 24 and the flywheel 50 at the time of resonance and, therefore, the vibration damping effect is increased.

In the dynamic damper 112, the basic characteristics (natural frequency) of the dynamic damper 112 is adjusted by adjusting the inertial mass of the flange 60 and the stiffness of the first coil springs 62. The damping term of the dynamic damper 112 is properly adjusted by adjusting the friction coefficients and the radial arrangement positions of the friction plates 94a and 94b and the stiffness of the disc spring 96.

The first coil springs 62 are disposed on the outer circumferential side in a radial direction as compared to the second coil springs 64. Therefore, even if torque is the same, a load applied to the dynamic damper 112 is made relatively smaller as compared to the case of disposing the first coil springs 62 on the inner circumferential side and, therefore, the stiffness of the first coil springs 62 can be made smaller. As a result, the natural frequency of the dynamic damper 112 proportional to the stiffness of the first coil springs 62 can easily be set to a lower frequency.

Since the damper device 38 has the folded portion 84a formed in the limiter lining plate 84 and the flange 60 is accordingly disposed at the position axially separated by a predetermined value from the flywheel 50, a space for disposing the flange 60 is expanded and the inertial mass of the flange 60 can easily be increased. Since it is known that the inertial mass and the natural frequency of the flange 60 are in an inversely proportional relationship, the natural frequency of the dynamic damper 112 can be set to a further lower frequency.

Figure 4:
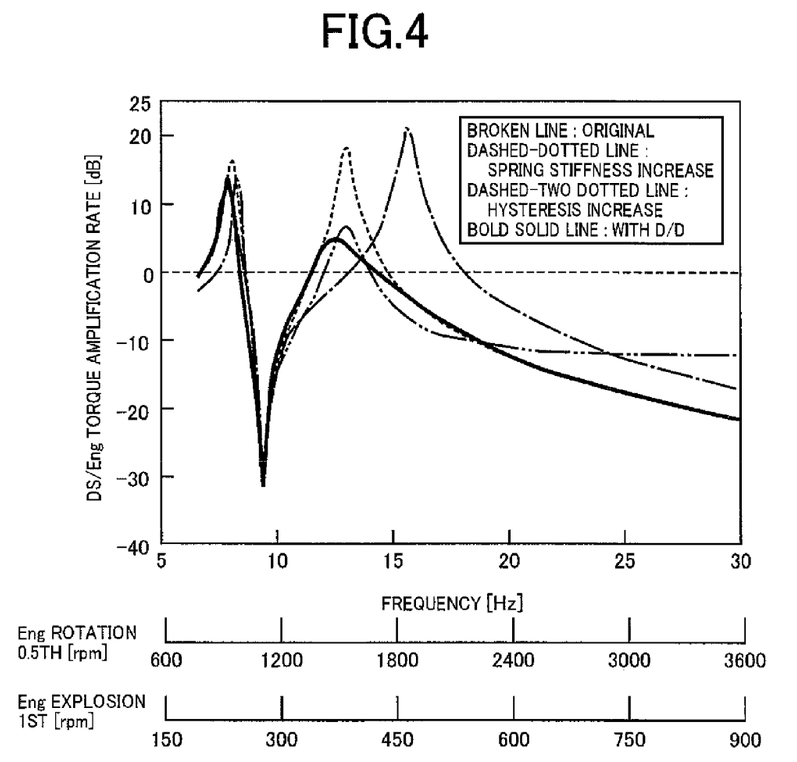
FIG. 4 depicts a calculation result of vibration damping effect achieved by disposing the damper device of FIG. 1.

FIG. 4 depicts a calculation result of vibration damping effect achieved by configuring the damper device 38 as described above. In FIG. 4, the horizontal axis indicates frequency and the vertical axis indicates a torque amplification rate of the wheel-side output shaft 14 to the engine 24 (torque of the wheel-side output shaft 14/engine torque). As the torque amplification rate increases, the vibration transmission sensitivity increases. FIG. 4 also depicts comparison examples of a model without the dynamic damper 112 (broken line: original), the case of increasing the stiffness of damper springs (the second coil springs 64 in the embodiment) to deal with the torsional resonance without providing the dynamic damper 112 (dashed-dotted line: spring stiffness increase), and the case of increasing hysteresis torque of a hysteresis mechanism to deal with the torsional resonance without providing the dynamic damper 112 (dashed-two dotted line: hysteresis increase).

Engine rotation speeds corresponding to frequencies of the rotation 0.5th order and the engine explosion first order (corresponding to the rotation second order of a four-cylinder engine) are depicted as reference under the horizontal axis. For example, a frequency of 15 Hz corresponds to an engine rotation of 1800 rpm in the rotation 0.5th order and an engine rotation of 450 rpm in the explosion first order (the rotation second order of a four-cylinder engine). FIG. 4 reveals that the torsional resonance of the rotation 0.5th order occurs in an engine normal rotation range (a range equal to or greater than 1000 rpm in general).

As depicted in FIG. 4, in the case of not providing the dynamic damper 112 as indicated by the broken line (hereinafter, original), the torque amplification rate increases at a frequency near 13 Hz. Therefore, the torsional resonance occurs. On the other hand, in the case of increasing the spring stiffness as indicated by the dashed-dotted line (hereinafter, spring stiffness increase), although the torsional resonance occurring at a frequency near 13 Hz is damped and a certain effect is achieved, the torque amplification rate is larger on the higher frequency side as compared to the original. In the case of increasing the hysteresis torque (hereinafter, hysteresis increase), although the torsional resonance occurring at a frequency near 13 Hz is damped and a certain effect is achieved, the torque amplification rate is larger on the higher frequency side as compared to the original.

In contrast, if the damper device 38 of the embodiment is provided, the torsional resonance occurring at a frequency near 13 Hz is damped as indicated by a bold solid line and the torque amplification ratio is changed in the same way as the original even on the higher frequency side. Therefore, if the damper device 38 of the embodiment is provided, the damping effect in the resonance range can be achieved without increasing the torque amplification rate (transmission sensitivity) in the high frequency range.

Although the torque limiter mechanism 76 is not actuated in the normal running state, the torque limiter mechanism 76 is actuated when the torque input to the torque limiter mechanism 76 exceeds an allowable torque Tmax in a predetermined running state. For example, as the torque amplification rate increases at the time of torsional resonance, the torque limiter mechanism 76 is more easily actuated. However, the actuation of the torque limiter mechanism 76 is not desirable and the number of actuations is desirably reduced. In this regard, in the damper device 38 of the embodiment, the number of actuations of the torque limiter mechanism 76 is reduced as the torque amplification rate is damped at the time of torsional resonance by the dynamic damper 112 as depicted in FIG. 4. This reduces the abrasion losses of the friction plates 78 and 82 of the torque limiter mechanism 76, thereby ensuring stable torque limiter characteristics.

As described above, according to the embodiment, the dynamic damper 112 is made up of the flange 60 and the first coil springs 62 operatively coupling the flange 60 to the input-side rotating member 56. The input-side rotating member 56 is mechanically coupled to the engine 24 via the flywheel 50 etc., and therefor has larger inertial mass as compared to the output-side rotating member 58. Since the dynamic damper 112 is coupled to the side of the input-side rotating member 56 having the inertial mass larger than the output-side rotating member 58, the damping effect of the dynamic damper 112 is increased. This is because a structure having larger inertial mass generally has larger vibration energy and, when the dynamic damper 112 is coupled to the side of the input-side rotating member 56 corresponding to the structure having large inertial mass, the vibration energy at the time of occurrence of torsional resonance is effectively absorbed by the dynamic damper 112. Since the damper characteristics are basically not different from basic characteristics of a conventional damper device except that the dynamic damper 112 is provided, the vibration transmission sensitivity is prevented from increasing on the high frequency side.

According to the embodiment, the first coil springs 62 are disposed on the outer circumferential side as compared to the second coil springs 64. Since a load applied to the first coil springs 62 becomes smaller when the first coil springs 62 are disposed on the outer circumferential side even if torque is the same, the spring stiffness of the first coil springs 62 can be lowered. Therefore, the natural frequency of the dynamic damper 112 proportional to the spring stiffness of the first coil springs 62 can be set to a lower frequency. Since the first springs 62 and the second springs 64 are made up of coil springs, the dynamic damper 112 has highly reliable and stable torsional characteristics as compared to rubber etc., and has high robustness of frequency against change in temperature.

According to the embodiment, the damper device 38 is disposed at a position axially separated by a predetermined value from the flywheel 50 and the flange 60 is disposed on the outer circumferential side of the first coil springs 62. As a result, the flange 60 can be disposed in a space formed on the outer circumferential side of the first coil springs 62 by disposing the damper device 38 at a position axially separated from the flywheel 50. Since the flange 60 is disposed in the space, an adjustment width of the flange 60 is expanded and the inertial mass of the flange 60 can easily be increased.

According to the embodiment, the torque limiter mechanism 76 preventing transmission of torque exceeding a preset torque value is interposed between the flywheel 50 and the input-side rotating member 56. As a result, if a torque exceeding the preset torque value is input from the side of the engine 24, a slip occurs in the torque limiter mechanism 76 and the torque exceeding the torque value is not transmitted to the downstream power transmission path from the damper device 38. Therefore, the torque limiter mechanism 76 acts as a safety device to prevent damage and durability deterioration of the drive system including the damper device 38 due to excessive torque transmission.

According to the embodiment, the friction mechanism 97 consisting of the friction plates 94a and 94b and the disc spring 96 is disposed between the input-side rotating member 56 and the flange 60. As a result, the vibration damping effect from the friction mechanism 97 can also be achieved in addition to the basic performance of the dynamic damper 112 by adjusting the friction coefficients and the arrangement positions of the friction plates 94a and 94b and the stiffness of the disc spring 96, etc.

According to the embodiment, the stopper pins 70 for holding the input-side rotating member 56 are brought into contact with the flange 60 when a relative rotation amount between the input-side rotating member 56 and the flange 60 reaches a predetermined value set in advance and also act as the stopper pins 70 limiting the elastic deformation amounts of the first coil springs 62 and the second coil springs 64 because of the contact with the output-side rotating member 58 when a relative rotation amount between the input-side rotating member 56 and the output-side rotating member 58 reaches the predetermined value set in advance. This leads to the utilization of the stopper pins 70 as members holding the input-side rotating member 56 as well as protecting the first coil springs 62 and the second coil springs 64. Therefore, the common stopper pins 70 having two functions can reduce the number of rivets, thereby suppressing manufacturing costs.

Although the embodiment of the present invention has been described in detail with reference to the drawings, the present invention is applicable in other forms.

For example, although the first coil springs 62 of the embodiment have an axial length longer than the second coil springs 64 and are formed into an arch shape in the embodiment, the first coil springs 62 may not have a longer axial length and may have a linear shape.

Although the vehicle drive device 10 is a hybrid drive device including the electric motors MG1 and MG2 in the embodiment, the present invention is not limited to a hybrid drive device and is properly applicable to drive devices of other types such as drive devices including conventional vehicle automatic transmissions.

Although the numbers of the first coil springs 62 and the second coil springs 64 are four in the embodiment, the number of the springs is not particularly limited and can freely be changed.

Although the disc spring 96 is used as one component of the friction mechanism 97 in the embodiment, a portion of the friction plate 94b may be deformed and used as a disc spring.

The embodiment is merely an exemplary embodiment and the present invention may be implemented in variously modified and improved forms based on the knowledge of those skilled in the art.

NOMENCLATURE OF ELEMENTS

24: engine
36: crankshaft (output shaft of the engine)
38: damper device (vehicle damper device)
39: power transmission shaft
50: flywheel (power transmission member)
56: input-side rotating member
58: output-side rotating member
60: flange (mass body)
62: first coil spring (first elastic member)
64: second coil spring (second elastic member)
70: stopper pin (pin)
76: torque limiter mechanism

The invention claimed is:

1. A vehicle damper device disposed between a power transmission member coupled to an output shaft of an engine and a power transmission shaft disposed concentrically and rotatably relative to the power transmission member, the vehicle damper device comprising:
   an input-side rotating member to which power of the engine is input via the power transmission member;
   an output-side rotating member relatively non-rotatably coupled to the power transmission shaft to be concentric and rotatable relative to the input-side rotating member;
   a mass body disposed rotatably relative to the input-side rotating member;
   a first elastic member interposed between the input-side rotating member and the mass body, the first elastic member operatively coupling the input-side rotating member and the mass body while elastically deforming depending on a relative rotation amount between the input-side rotating member and the mass body; and
   a second elastic member interposed between the input-side rotating member and the output-side rotating member, the second elastic member operatively coupling the input-side rotating member and the output-side rotating member while elastically deforming depending on a relative rotation amount between the input-side rotating member and the output-side rotating member, wherein
   the first elastic member and the second elastic member are made up of coil springs,
   the first elastic member is disposed on an outer circumferential side relative to the second elastic member, and
   the damper device is disposed at a position axially separated by a predetermined value from the power transmission member, and the mass body is disposed on the outer circumferential side relative to the first elastic member.

2. The vehicle damper device of claim 1, wherein a torque limiter mechanism for preventing transmission of torque exceeding a preset torque value is interposed between the power transmission member and the input-side rotating member.

3. The vehicle damper device of claim 2, wherein a pin for holding the input-side rotating member comes into contact with the mass body when a relative rotation amount between the input-side rotating member and the mass body reaches a first predetermined value set in advance and comes into contact with the output-side rotating member when a relative rotation amount between the input-side rotating member and the output-side rotating member reaches a second predetermined value set in advance to act as a stopper pin limiting elastic deformation amounts of the first elastic member and the second elastic member.

4. The vehicle damper device of claim 1, wherein a pin for holding the input-side rotating member comes into contact with the mass body when a relative rotation amount between the input-side rotating member and the mass body reaches a first predetermined value set in advance and comes into contact with the output-side rotating member when a relative rotation amount between the input-side rotating member and the output-side rotating member reaches a second predetermined value set in advance to act as a stopper pin limiting elastic deformation amounts of the first elastic member and the second elastic member.

* * * * *